(12) United States Patent
Bodin et al.

(10) Patent No.: US 7,988,397 B2
(45) Date of Patent: Aug. 2, 2011

(54) FASTENING ELEMENT

(75) Inventors: Jan-Olof Bodin, Alingsås (SE); Göran Levin, Hisings Kärra (SE); Joel Asp, Göteborg (SE)

(73) Assignee: Volvo Lostvagnor AB, Göteborg (SE)

( * ) Notice: Subject to any disclaimer, the term of this patent is extended or adjusted under 35 U.S.C. 154(b) by 457 days.

(21) Appl. No.: 11/577,606

(22) PCT Filed: Sep. 19, 2005

(86) PCT No.: PCT/SE2005/001353
§ 371 (c)(1),
(2), (4) Date: Apr. 20, 2007

(87) PCT Pub. No.: WO2006/043863
PCT Pub. Date: Apr. 27, 2006

(65) Prior Publication Data
US 2008/0187409 A1    Aug. 7, 2008

(30) Foreign Application Priority Data
Oct. 22, 2004    (SE) ...................................... 0402577

(51) Int. Cl.
*F16B 35/00*    (2006.01)

(52) U.S. Cl. ........................................ 411/399; 411/424
(58) Field of Classification Search .................. 411/361, 411/399, 424, 411, 387.2, 180, 107, 176
See application file for complete search history.

(56) References Cited

U.S. PATENT DOCUMENTS

| 45,133 | A | * | 11/1864 | Bonwill | 411/421 |
| 519,411 | A | * | 5/1894 | North | 411/396 |
| 2,147,343 | A | * | 2/1939 | Hokansom | 403/284 |
| 2,490,594 | A | * | 12/1949 | Madden | 411/180 |
| 2,895,368 | A |  | 7/1959 | Place |  |
| 3,047,036 | A | * | 7/1962 | Waltermire | 411/176 |
| 3,418,012 | A |  | 12/1968 | La Torre |  |
| 3,731,961 | A | * | 5/1973 | Becker | 403/408.1 |
| 4,033,243 | A | * | 7/1977 | Kirrish et al. | 411/338 |
| 4,396,309 | A | * | 8/1983 | McCormick | 403/14 |
| 4,697,969 | A | * | 10/1987 | Sparkes | 411/387.7 |
| 5,290,131 | A | * | 3/1994 | Henriksen | 411/180 |
| 7,153,075 | B2 | * | 12/2006 | Sommer et al. | 411/412 |

FOREIGN PATENT DOCUMENTS

| GB | 399979 A | 10/1933 |
| GB | 399980 A | 10/1933 |

OTHER PUBLICATIONS

International Search Report for corresponding International Application PCT/SE2005/001353.

* cited by examiner

*Primary Examiner* — Flemming Saether
(74) *Attorney, Agent, or Firm* — WRB-IP LLP

(57) ABSTRACT

A fastening element is provided for connecting mechanical parts to one another. The fastening element includes integrated, cutting machining grooves which are designed to work the edges of the hole, during fixing of the fastening element, by the removal of material in the parts to be mutually connected, so that the hole is made to fit against the shell surface of the fastening element. A fastening element can be provided which, in a cheap and simple manner, is designed to absorb both occurring shearing loads and compression/traction loads between the connected parts.

20 Claims, 4 Drawing Sheets

FASTENING ELEMENT

BACKGROUND AND SUMMARY

The present invention relates to a fastening element.

Mechanical parts which are subjected to high stresses in different directions are traditionally connected by means of two types of joints, on the one hand joints which absorb shearing load, for example rivets, and on the other hand joints which absorb traction/compression load, for example screw joints. Conventional screw joints have a limited shearing load absorbency, owing to play between the screw and the hole in the joint. This play can be eliminated by means of special tools, in which the hole is precision-worked to provide a press fit for a special screw. This type of joint entails high assembly costs.

It is desirable to produce a fastening element which combines shearing load absorbency and compression/traction load absorbency within a single type of joint, without the need for special assembly tools.

BRIEF DESCRIPTION OF THE FIGURES

The invention will be described in greater detail below with the aid of an example and with reference to the appended drawings, in which:

FIG. 5 shows the fastening element in the course of being fitted for the connection of two parts, while

DETAILED DESCRIPTION

Figure 1:
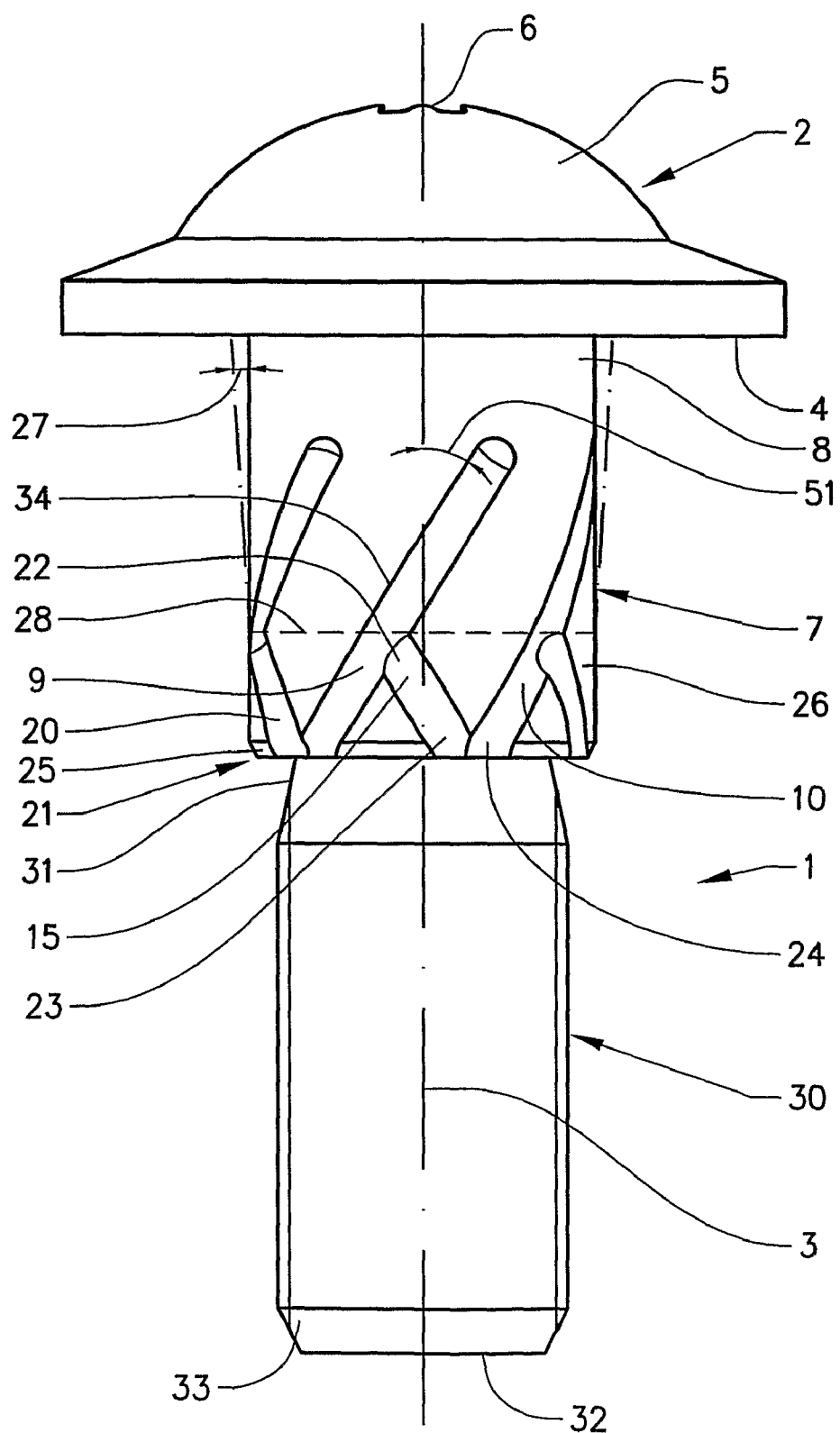
FIG. 1 shows with a side view the fastening element according to the invention.

The structure of the fastening element can be seen from FIG. 1. In the illustrated example, the fastening element is realized as a screw or bolt having a pin-shaped lead-through part 1, which is intended to be passed through one or more holes in parts to be mutually connected, and a head 2, which is designed to, in the finished joint, substantially absorb forces in the longitudinal direction of the fastening element, i.e., in the direction of the longitudinal axis 3. For this purpose, the head 2 has a contact surface 4, which is annular and expediently flat and extends in a radial plane to the longitudinal axis. The head further has a stop face 5, which is facing away from the contact surface 4 and is designed to receive blows for driving the fastening element into the hole or holes, alternatively to secure the fastening element in its rotational direction by means of a suitable tool, for example a socket screw key which can be brought into torsional engagement with an engaging portion 6 to secure the fastening element about the longitudinal axis 3.

The lead-through part 1 has a fitting part 7, which is designed to extend through and fit into the hole in which the fastening element shall sit. For this purpose, the fitting part has a substantially cylindrical shell surface 8 of a diameter which is accurately matched to the size of the hole. According to the invention, the fitting part has cutting machining grooves 9-20, which are distributed over the shell surface and emerge at their one end onto an edge portion 21 of the fitting part and extend helically at an angle 51 relative to the longitudinal axis 3 of the fastening element, i.e., have an inclination relative to the latter. In the illustrated example, the machining grooves have a first type of groove which extends over the majority of the length of the fitting part 7 and has such an extent that the machining grooves of this first type together cover the whole of the circumference of the shell surface 8, i.e., that the grooves at least have such a circumferential extent that they mutually overlap. Apart from this first type of machining groove 9-14, according to the illustrated example a second type of machining groove 15-20 is provided, hereinafter referred to as auxiliary grooves, which have an oppositely directed inclination and have a shorter extent than the principal grooves. The auxiliary grooves connect at their one end 22, with slight intrusion, to each principal groove and emerge at their other end 23 onto the edge portion 21 and, in the illustrated example, together with neighboring principal grooves such that they form a joint groove mouth 24. The purpose of the auxiliary grooves is, on the one hand, to prevent the fastening element from rotating as it is drawn into the locating hole, i.e., to compensate for the torsional force originating from the principal grooves, and, on the other hand, to cooperate with the principal grooves as the wall surface of the locating hole is worked.

In addition to the edge portion having a short, angled bevel 25, the fitting part 7 has a conically tapered portion 26 situated beneath the cylindrical shell surface 8 and having a slight angle of inclination 27 relative to the longitudinal axis 3. The conical portion 26 transforms into the cylindrical portion at a boundary line 28, indicated by a dash-dot line. In the illustrated example, the boundary line 28 lies essentially at the bifurcation 29 between each principal groove 9-14 and auxiliary groove 15-20.

Beneath the fitting part 7, the lead-through part 1 has a fastening part 30, which is intended to be fixed in an opposing fastening element, such as a nut, the fastening part 30 being threaded and having a diameter which is less than the diameter of the fitting part, so that the fastening part can be passed through the hole into which the fitting part shall fit. In the illustrated example, the fastening part 30 further has a beveled portion 31 against the fitting part 7, so that the edge portion 21 is clearly marked.

Figure 2:
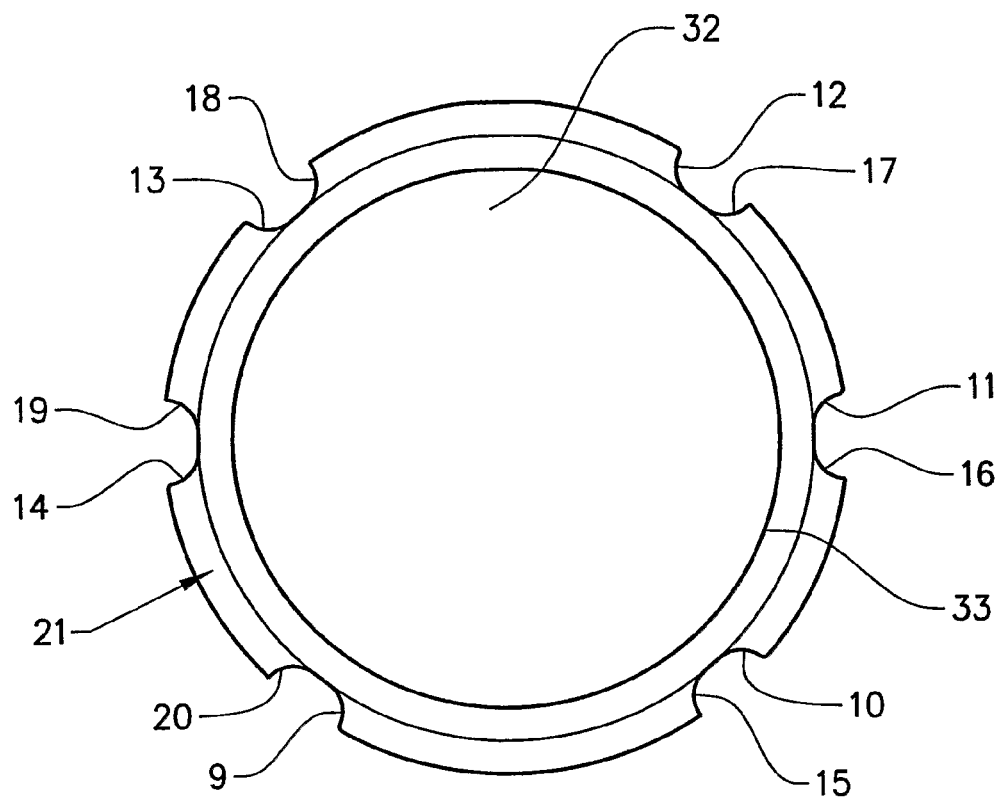
FIG. 2 shows an end view of the fastening element.

FIG. 2 shows an end view of the fastening element, viewed from the fastening part 30, the end face 32 and the bevel 33 thereof being represented by the two innermost circular lines. Appearing outside these are the ends, i.e., the mouths, of the machining grooves, which are evenly distributed over the periphery of the edge portion 21. That which lies beyond the groove ends has been omitted for the sake of clarity.

Figure 3:
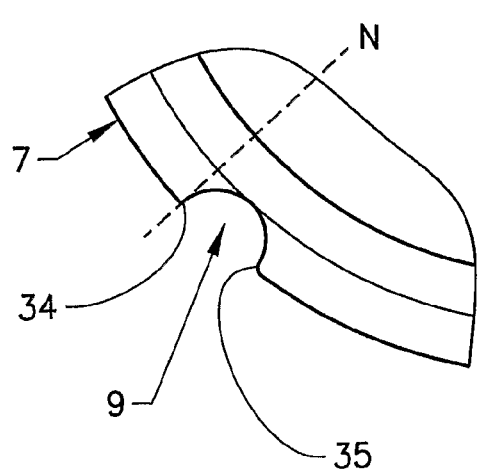
FIG. 3 is an enlarged, partially broken view of a portion along the boundary line 28.
Figure 4:
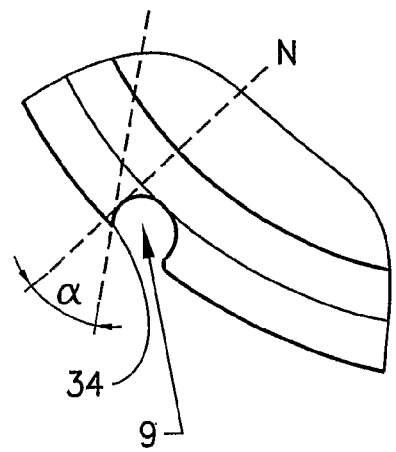
FIG. 4 shows an alternative embodiment of the portion in FIG. 3.

In FIG. 3 is shown an enlarged portion of a section with the machining groove 9 along the boundary line 28. It can here be seen that the machining groove 9 has sharp edges 34, 35 toward the transition to the shell surface. This applies to the machining groove 9 in both the cylindrical part 8 and the conical part 26. When the fastening element is drawn into the locating hole, one of the edges 34, 35 will act as a cutting edge, in this example the edge 34. The machining groove 9 is here configured with a rounded cross-sectional form and is advantageously asymmetrical so that at least one sharp edge 34 is somewhat pointed such that the edge forms a cutting edge which can work the edges in the hole into which the fastening element shall be introduced. In the illustrated example, the cutting edge at the edge 34 coincides with the normal N of the shell surface. Depending on, inter alia, the production method for the grooves, the cutting edge can also be given other angles in relation to the normal N of the shell surface. In FIG. 4, an example is shown in which the edge is pointed with an angle $\alpha$. Advantageously, the angle $\alpha$ is positive, i.e., greater than 0°. For example, the angle a is between 0° and 30° in order to obtain a good cut. Depending on the production method, the angle α can also be somewhat negative, i.e., somewhat less than 0°. Advantageously, the angle α is in this case between 0° and −20°. The appearance of the edge 34 also affects the quality of the cut. Advantageously, the edge is as sharp as possible, i.e., without any radius. The depth and width of the grooves are tailored such that the removed material from the shell surfaces of the locating hole can be received in the grooves. The embodiment of the machining groove 9 which is here described applies to both the principal grooves 9-14 and the auxiliary grooves 15-20.

In order to be able to work the shell surfaces of the locating hole, the fastening element, or at least the cutting edges on the machining grooves, must be significantly harder than the material in which the fastening element shall be fitted. It is therefore advantageous to produce the fastening element in a material which is harder than the material in which the fastening element shall be fitted. It is also possible to harden the whole of the fastening element, or just the cutting edges, to allow a reliable cut. The dimensioning of the strength of the fastening element also depends on the loads to be absorbed by the fitted fastening element.

Figure 5:
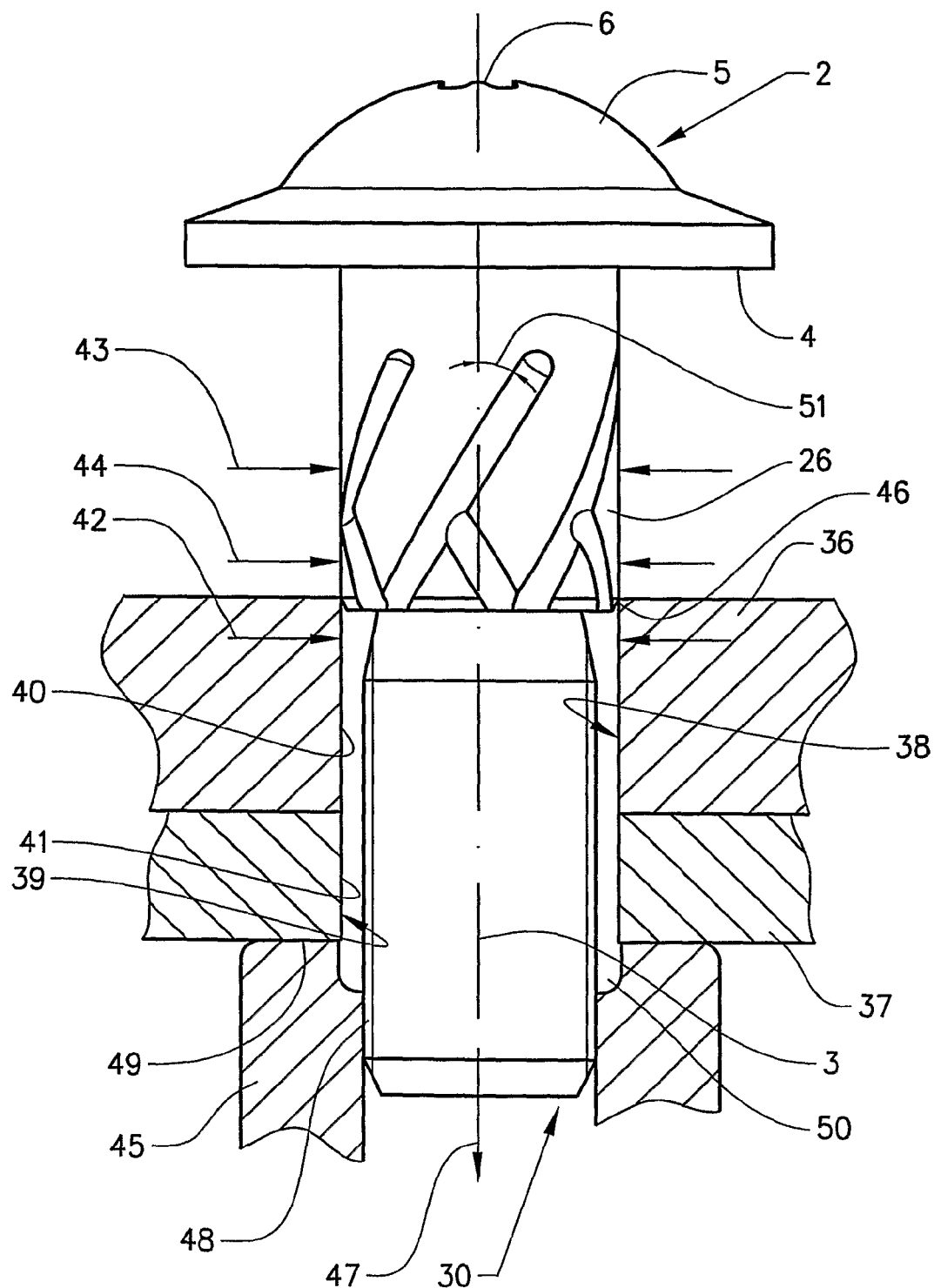
Figure 6:
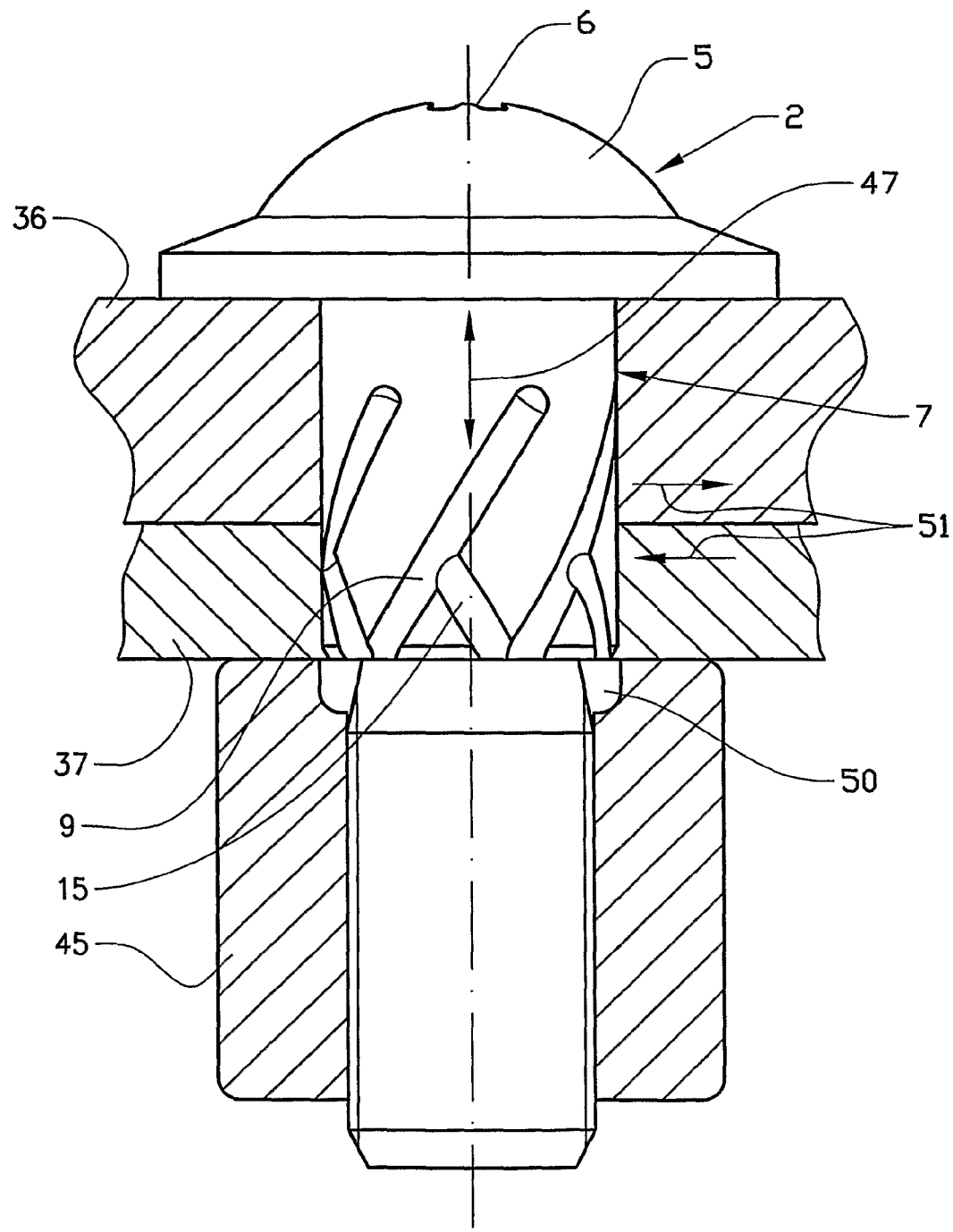
FIG. 6 shows the fastening element in the end-fitted state.

FIGS. 5 and 6 show, with a cross section through a joint between two mechanical parts 36, 37, the function of the fastening element. The two mechanical parts can be two parts in a beam construction of a motor vehicle which are to be mutually connected. The two parts are each provided with a respective through hole 38, 39, which through holes are arranged one directly in front of the other, i.e., are coaxial, and have a concave, cylinder-jacket-shaped shell surface 40, 41, which is prefabricated with a diameter 42 which is less than the diameter 43 of the fitting part but greater than the smallest diameter 44 of the conical portion, i.e., the diameter in the region by the edge portion 21.

With the above-stated preconditions, the fitting of the fastening element so as to create a joint between the two parts 36, 37 proceeds as follows. The fastening element is driven in with its lead-through part 1 through the coaxially arranged holes 38, 39. This is achieved by firstly introducing the fastening element with its fastening part 30 into the holes, to the point where the fitting part 7, with its conical portion 26, makes contact with the circumferential edge 46 of the first hole 38. Next, the fastening element is driven in in the direction of the longitudinal axis, or, more precisely, in the direction of the arrow 47. The drive-in force is achieved, for example, by the screwing of the nut 45 onto the threaded portion 48 of the fastening part 30, whereby the axial force is created by the bearing contact of the nut against the contact surface 49 of the part 37. The axial force can also be created by blows or pressing against the head 2, or, more precisely, the stop face 5 thereof. During the drive-in motion, a machine-cutting will be performed, through the machine-cutting of the machining grooves 9-20 in the shell surface 40, 41 of the holes 38, 39. The cutting edge portions 34, 35 of the grooves will here serve as cutting tools, while, at the same time, material chips can be collected in the grooves and/or in the interspace 50. A rougher machining is realized by means of the grooves in their extent in the conically tapered portion 26 of the fitting part 7, while the grooves in the cylindrical portion primarily create a fine cut or smoothing. The size of the interspace 50 is created by the beveled portion 31 and the unthreaded part of the nut 45. This space can be used to receive machined material. The length of the unthreaded part of the nut 45 is also tailored such that the preload which the fastening element shall acquire is indeed attainable.

As a result of the performed cut, the hole diameter will therefore be increased and matched to the hole diameter 43 of the fitting part over the cylindrical shell surface 8, the end result being a joint, see FIG. 6, with no play between the fitting part and the holes, which therefore produces a joint with a capacity to absorb both shearing forces in the direction of the arrow 51 and axial forces in the direction of the arrow 47. In the illustrated example, the hole 39 is in the lower part, however, partially conical and matched to the conical portion of the fastening element.

The invention is not limited to the illustrative embodiments described above and shown in the drawings, but can be varied within the scope of the following patent claims. For example, the inclusion of the illustrated auxiliary grooves is not entirely necessary. In addition, the extent and inclination of the grooves may vary, as may the cross-sectional form of the grooves.

The invention claimed is:

1. A fastening element for connecting mechanical parts to one another, at least one of the mechanical parts having a hole having a first diameter extending therethrough, comprising:
 a pin-shaped lead-through part adapted to extend through the hole; and
 a head having a contact surface for bearing contact against a contact surface on one side of the hole, the lead-through part having a fitting part adapted to extend through the hole, and a fastening part of a second diameter which is less than the first diameter and is adapted to fasten in a fastening component, wherein the fitting part has a third diameter which is greater than the first diameter prior to fixing of the fastening element, and the fitting part has cutting machining grooves which are adapted to work edges of the hole, during fixing of the fastening element, by removal of material such that the hole is made to fit against a shell surface of the fitting part, the fastening element being adapted to absorb both occurring shearing loads and compression/traction loads between the connected parts, and wherein a hardness of edges of the machining grooves is greater than a hardness of a remaining portion of the fitting part.

2. The fastening element as claimed in patent claim 1, wherein the machining grooves have an axial extent having an angle of inclination relative to an axial plane of the fitting part.

3. The fastening element as claimed in claim 2, wherein the head comprises an engaging portion.

4. The fastening element as claimed in claim 2, wherein an angle of a surface of an edge portion of the machining grooves relative to a normal of the shell surface is greater than 0°.

5. The fastening element as claimed in claim 2, wherein an angle of a surface of an edge portion of the machining grooves relative to a normal of the shell surface is less than 0°.

6. The fastening element as claimed in claim 2, wherein an angle of a surface of an edge portion of the machining grooves coincides with a normal of the shell surface.

7. The fastening element as claimed in patent claim 2, wherein the machining grooves extend such that they together cover a whole of a circumference of the fitting part.

8. The fastening element as claimed in patent claim 7, wherein the fitting part has a cylindrical shell surface and transforms in a direction of the fastening part into a conically tapered portion which, at its narrowest point, has a diameter greater than the diameter of the fastening part and is concluded with a circumferential edge.

9. The fastening element as claimed in claim 8, wherein the circumferential edge is beveled.

10. The fastening element as claimed in patent claim 9, wherein the fastening part is threaded for screw-mounting of a nut and has a portion which tapers toward the fitting part.

11. The fastening element as claimed in patent claim 8, wherein the machining grooves extend continuously over a majority of a length of the fitting part and a length of the conically tapered portion and emerge into the circumferential edge.

12. The fastening element as claimed in claim 11, wherein the circumferential edge is beveled.

13. The fastening element as claimed in patent claim 12, wherein the fastening part is threaded for screw-mounting of a nut and has a portion which tapers toward the fitting part.

14. The fastening element as claimed in patent claim 11, wherein the fitting part has auxiliary grooves which have an oppositely directed inclination to other ones of the machining grooves and connect to the other ones of the machining grooves.

15. The fastening element as claimed in patent claim 14, wherein each auxiliary groove emerges with one end adjacent to a mouth of a longer one of the other ones of the machining grooves at the edge, and connects to neighboring machining grooves at a transition between the a conically tapered portion of the fitting part and the cylindrical portion.

16. The fastening element as claimed in patent claim 15, wherein the machining grooves extend spirally with an angle of inclination to the longitudinal axis of between 25 and 75 degrees.

17. The fastening element as claimed in claim 1, wherein the head comprises an engaging portion.

18. The fastening element as claimed in claim 1, wherein an angle of a surface of an edge portion of the machining grooves relative to a normal of the shell surface is greater than 0°.

19. The fastening element as claimed in claim 1, wherein an angle of a surface of an edge portion of the machining grooves relative to a normal of the shell surface is less than 0°.

20. The fastening element as claimed in claim 1 wherein an angle of a surface of an edge portion of the machining grooves coincides with a normal of the shell surface.

\* \* \* \* \*

UNITED STATES PATENT AND TRADEMARK OFFICE
CERTIFICATE OF CORRECTION

PATENT NO. : 7,988,397 B2
APPLICATION NO. : 11/577606
DATED : August 2, 2011
INVENTOR(S) : Jan-Olof Bodin et al.

It is certified that error appears in the above-identified patent and that said Letters Patent is hereby corrected as shown below:

The assignee's name was incorrectly spelled on the Title page of the patent as "Volvo Lostvagnor AB" and should be spelled as:
--Volvo Lastvagnar AB--.

Signed and Sealed this
Thirtieth Day of August, 2011

David J. Kappos
*Director of the United States Patent and Trademark Office*